June 27, 1933. T. C. HOLLNAGEL 1,915,609
AUTOMOTIVE VEHICLE TRUCK
Filed Sept. 12, 1929  3 Sheets-Sheet 1
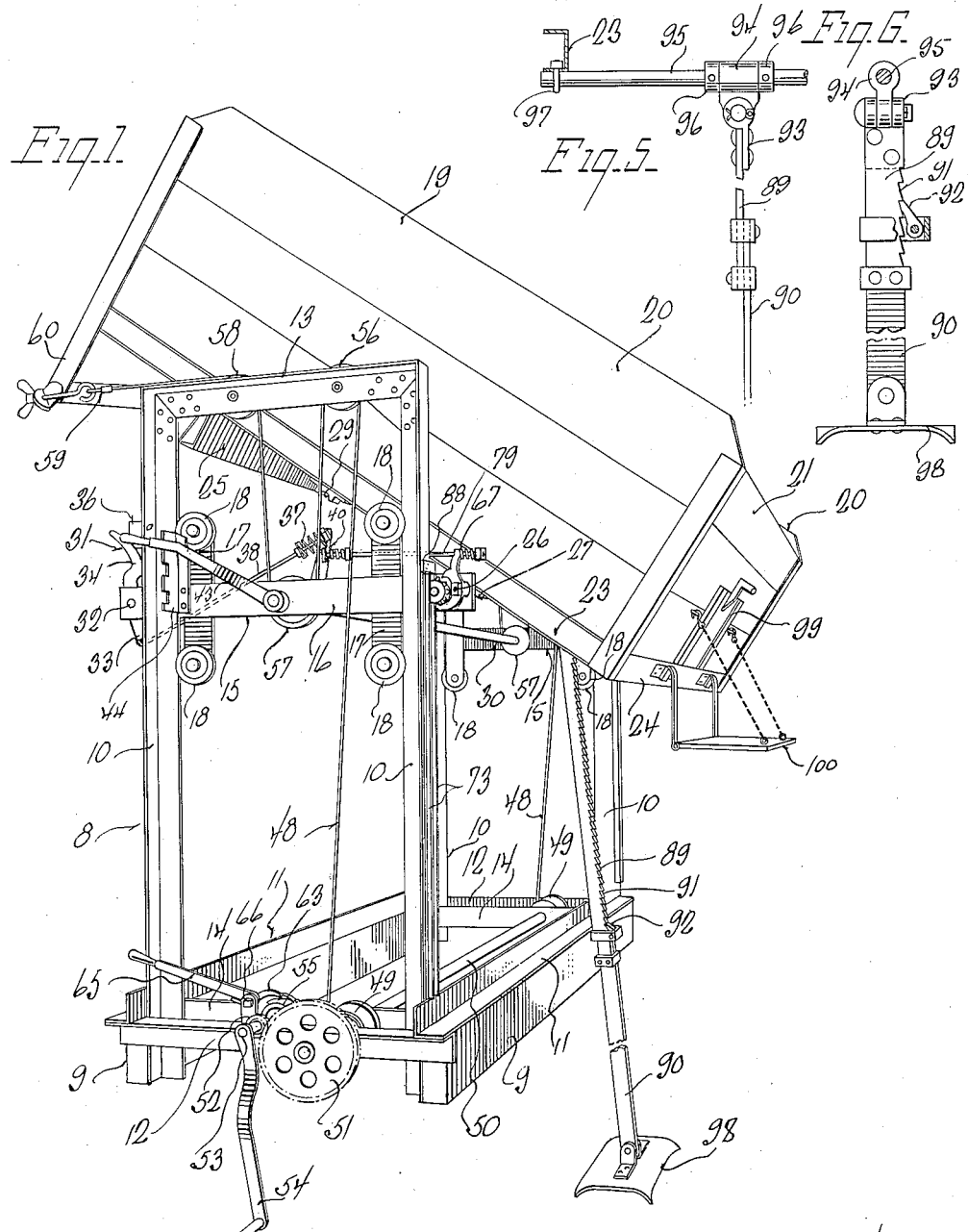

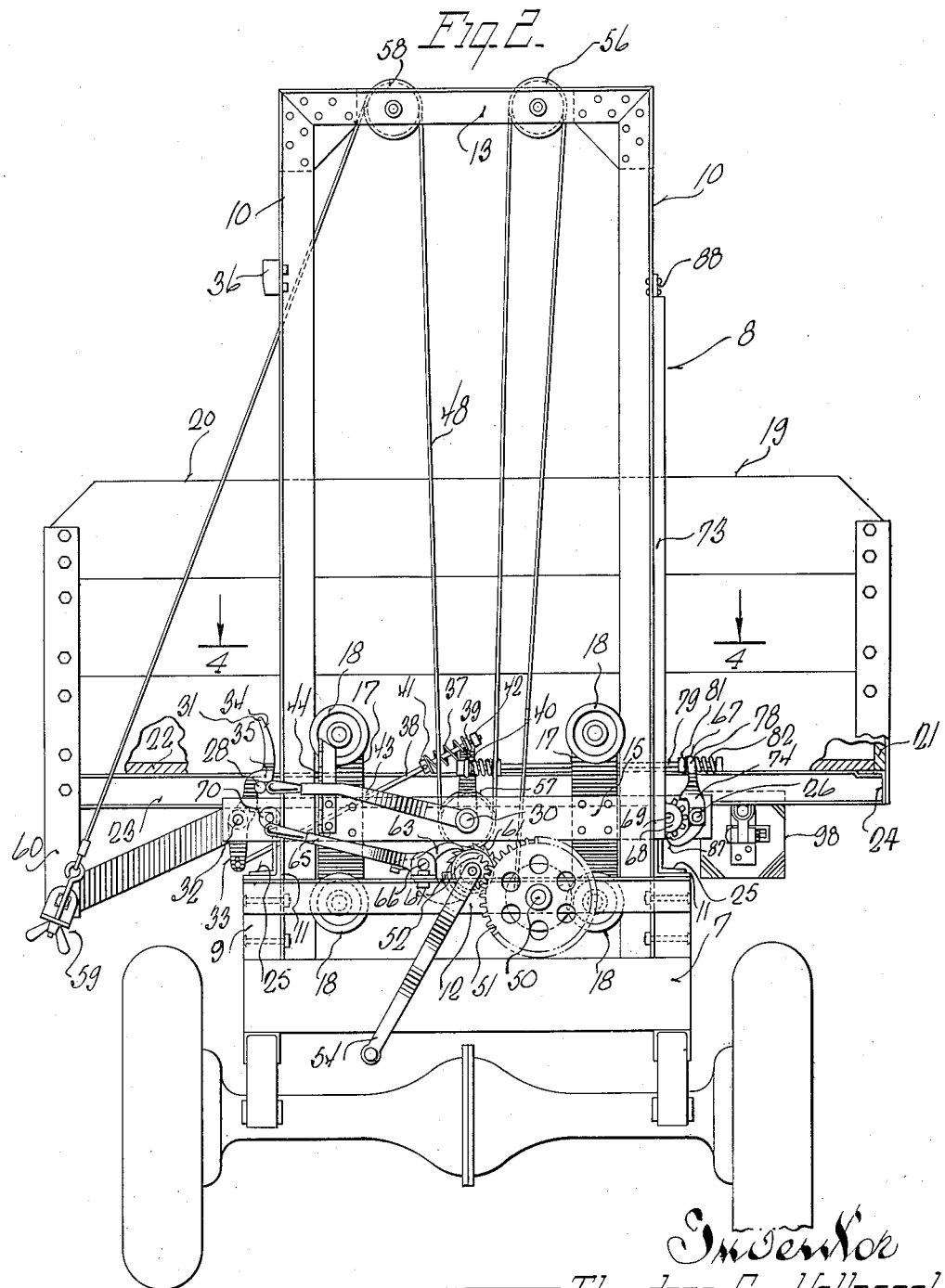

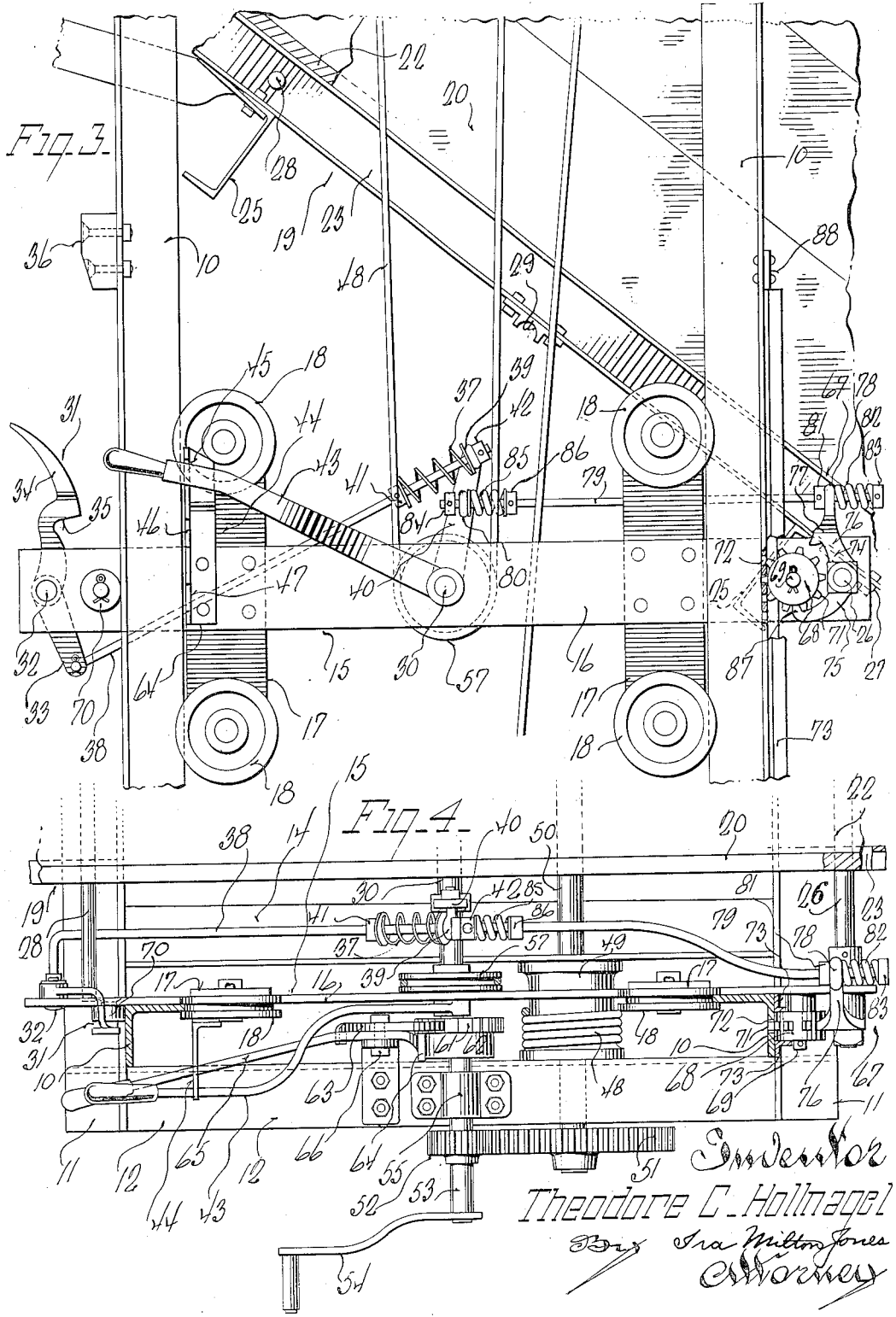

Patented June 27, 1933

1,915,609

UNITED STATES PATENT OFFICE

THEODORE C. HOLLNAGEL, OF MILWAUKEE, WISCONSIN

AUTOMOTIVE VEHICLE TRUCK

Application filed September 12, 1929. Serial No. 392,092.

This invention relates to certain new and useful improvements in automotive vehicle trucks and refers more particularly to that type having tilting bodies.

It is an object of this invention to provide a vehicle truck of the character described in which the body is not only tiltable, but may be elevated so that its lowermost side, when tilted is sufficiently high to permit containers to be filled with material from the body, to be supported at shoulder height.

Another object of this invention is to provide an automotive vehicle truck having a body adapted to be elevated and tilted to one side.

Another object of this invention resides in the provision of a single means for elevating and tilting an automotive vehicle body.

Another object of this invention is the provision of an automatic safety device which precludes the possibility of dropping the body while being raised.

A further object of this invention resides in the provision of an automotive vehicle truck having a frame provided with vertical tracks upon which a carriage moves to raise and lower the body member connected with the carriage.

And a still further object of this invention resides in the provision of means whereby the body may be tilted at any desired elevation.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a perspective view of my improved vehicle body and the frame supporting the same shown detached from the truck.

Figure 2 is a rear view illustrating the body and its supporting frame mounted upon an automotive vehicle truck chassis.

Figure 3 is an enlarged fragmentary view similar to Figure 2 illustrating the body elevated and tilted.

Figure 4 is a fragmentary sectional view taken through Figure 2 on the plane of the line 4—4; and Figures 5 and 6 are detail views illustrating the construction of the supporting leg.

Referring now more particularly to the accompanying drawings in which like numerals designate like parts throughout the several views, numeral 7 represents the chassis frame of a conventional automotive vehicle truck upon which a stationary body supporting frame indicated generally as at 8 is adapted to be mounted.

The frame 8 comprises longitudinal rails 9 which rest upon the side sills of the vehicle chassis, and uprights 10 preferably formed of angle iron, and secured to the ends of the rails with their flanges directed inwardly towards each other to form vertical tracks at each end of the frame for a purpose to be later described. Longitudinal angle iron members 11 connected at their ends with the upright members 10, directly above the longitudinal rails 9 serve to reinforce the rails and provide a rest upon which the body 19 seats when lowered.

The rails 9 and consequently the uprights 10 are maintained in proper spaced relation by transverse angle iron members 12 connected at their ends with the ends of the longitudinal angle members 11, and by transverse cross pieces 13 connecting the upper ends of each pair of uprights 10. Additional angle iron cross members 14 span the longitudinal members 11, at points spaced inwardly from the transverse members 12 for a purpose to be later described.

The inwardly directed flanges of each pair of uprights 10 provide trackways, as stated, between which carriages indicated generally as at 15 are vertically movable. The carriages 15 consist of a main transverse member 16, preferably of flat structural steel, to which a pair of vertical cross pieces 17 is fixed, the ends of which freely rotatably mount peripherally grooved wheels 18 arranged to engage the inwardly directed flanges of the uprights and thereby guide the movement of the carriages.

The carriages 15 carry the body 19, which consists of end walls 20, side walls 21, and a bottom 22, laid upon a plurality of cross pieces 23 preferably formed of channel iron and having their ends secured to angle irons 24 extending along the lower edges of the sides 21. The fabricated floor of the body rests on a pair of longitudinal channel iron members 25 extended across the plurality of transverse members 23 and secured thereto at opposite sides of the longitudinal axis of the body in line with the longitudinal angle irons 11 to be supported thereon, as illustrated in Figure 2, when the body is in its normal lowered position. It will be noted that the members 25 snugly engage the angle irons 11 to prevent side-wise shifting of the body.

The body 19, while normally supported in load carrying position, by resting on the side angles 11, is also connected at its ends, with the two carriages 15, to be elevated vertically thereby. The connection of the body with the carriages is pivotal to accommodate tilting and comprises a longitudinal rod or shaft 26 extending across and secured to the transverse cross channels to one side of the longitudinal axis of the body, by conventional bearing members 27, with its ends projected beyond the body and journaled in apertures formed in the adjacent end of each carriage member 16. The opposite side of the body is supported by resting the ends of a shaft 28, also secured to the cross channels 23 and projected beyond the outermost ones, upon the upper edges of the adjacent ends of the carriage members 16. An additional support for the body is provided by a semi-bearing member 29 fixed to each outermost channel member 23 and adapted to rest on a central longitudinal shaft 30 journalled in the carriage members 16, for a purpose to be later described.

If desired the shafts 26 and 28 may be divided into stub shafts extending inwardly only to the first intermediate cross channels. The body is thus tiltable about the axis of the shaft 26, and to prevent such tilting except when desired, latch members 31 are carried by the carriages to engage over the ends of the shaft 28.

As both carriages and their latches and actuating mechanism are identical the following description will be in the singular.

The latch 31 is pivoted as at 32 to the adjacent end of the carriage member 16, and comprises a downwardly extending lever arm 33 and an upwardly projected arm 34 shaped to form a hook 35 which engages over the end of the shaft 28 to hold the body against upward movement. The outermost end of the upper arm 34 is offset and curved outwardly to lie in the plane of a stop 36 fixed to the adjacent upright 10, and to ride onto the stop and effect the disengagement of the latch from the shaft end, upon elevation of the body.

The latch 31 is normally yieldably urged to active position engaging its hook 35 over the shaft 28 by a spring 37 mounted on a rod 38 having one end connected with the outer end of the arm 33 and its other end portion passed through an eye-bolt 39 carried by a lever 40 fixed to the shaft 30, the spring being confined between the eye-bolt and a collar 41 secured on the rod 38.

The end of the rod 38 outwardly of the eye-bolt 39 has a stop collar 42 fixed thereto so that a rocking movement of the lever 40 toward the right with respect to Figure 2, or to the position illustrated in Figure 3, draws the rod 38 to the right and moves the latch 31 about its pivotal mounting to disengage its hook 35 from the shaft 28. As the levers 40 of both the front and rear latching mechanisms are fixed to the shaft 30, their simultaneous rocking is effected by the oscillation of the shaft through an operating handle 43 fixed to the rear end of the shaft. Raising of the handle moves the lever 40 to the right to release its latch, and with the handle in neutral position the lever is in a vertical position maintaining the spring 37 in compression to hold the latch closed. The handle is also capable of downward movement to swing the lever 40 to the left for a purpose to be later described and to maintain the handle in any position of adjustment, a stop member 44 is provided. The stop member may consist of a piece of angle iron secured to the carriage member 16 and having upper, neutral, and lower notches 45, 46 and 47 respectively formed in the edge of its extended flange, in which the handle is maintained by its inherent resiliency.

The elevation of the carriages and consequently the body is accomplished by winding a pair of cables 48, one for each carriage, upon drums 49 fixed to the end portions of a longitudinal shaft 50.

The shaft 50 is journalled in aligned apertures in the transverse cross pieces 12 and 14 and has the cable drums 49 fixed thereon between the transverse members 12 and 14. The rear end of the shaft 50 is extended and has a gear 51 fixed thereto which meshes with a pinion 52 on a crankshaft 53, to be driven thereby upon actuation of a crank-handle 54, the crankshaft 53 being journalled in a suitable bearing 55 fixed to the adjacent transverse cross piece 12.

One end of each cable is fixed to its drum and the other end is extended upwardly over an idler sheave 56 freely rotatably mounted upon the cross piece 13, is brought downwardly to be trained about a similar sheave 57 freely rotatable on the longitudinal shaft 30 journalled in the members 16 of the carriages, extending upwardly to be trained about a sheave 58 mounted, like the sheave 56, upon the cross piece 13, to be fixed, as at 59, to a downwardly extending bracket 60 carried by the body 19.

The crankshaft 53 has a ratchet 61 and a brake drum 62 fixed thereto, with which a pawl 63 and a brake-shoe 64 are respectively engageable. Both the pawl 63 and the brake-shoe 64 are carried by a handle 65 pivotally mounted as at 66 so that downward movement of the outer end of the handle withdraws the pawl from the ratchet and applies the brake-shoe onto the brake drum. However, this structure is merely conventional design and may be modified without departing from the spirit of the invention. It is also to be understood that any suitable means for driving the drums 49 may be employed in place of the manually operated means shown.

During elevation of the body, the handle 43 is preferably placed in its lowermost position, this further compresses the spring 37 by moving the lever 40 to the left and prevents accidental release of the latch. The movement of the lever 40 to the left by the depression of the handle also moves a safety device indicated generally as at 67, into active position. This device consists of a roller 68 freely rotatably mounted upon the carriage by a stub shaft 69 and arranged to ride on the outer flange of the adjacent upright 10. The roller 68 in cooperation with a second roller 70 similarly mounted at the opposite side of the carriage and engageable with the outer flange of the opposite upright 10, assists the wheels 18 of the carriage to guide the vertical movement of the body and prevents spreading of the uprights.

The periphery of the roller 68 is provided with teeth 71 which engage in spaced apertures 72 formed in the flange of the adjacent upright 10 to provide a positive connection between the carriage and the said upright, a pair of angle irons 73 fixed to the upright at opposite sides of the roller or wheel 68 forming guides to prevent misalignment between the teeth and the apertures. During raising and lowering of the body the wheel 68 will thus be positively driven in one direction or the other.

A composite pawl 74 cooperates with the teeth of the wheel 68 to provide the safety feature during raising of the body and also provide means by which the upward movement of the body may be arrested at any desired elevation to effect tilting thereof. This composite pawl 74 is pivotally mounted on the extended end of the shaft 26 about which the body tilts and comprises a lower arm 75 and an upper arm 76. The upper arm 76 has a tooth or projection 77 formed thereon to engage the wheel teeth and is so shaped, as to permit counter-clockwise rotation of the wheel incidental to upward movement of the body, but to prevent clockwise rotation of the wheel which would take place during downward movement of the body, when the pawl is moved to its proper position.

The position of the pawl 74 is governed by the position of the operating handle 43 through the lever 40 in the following manner:

The outermost end of the upper arm 76 of the pawl has an eye 78 formed thereon through which one end portion of a rod 79 is freely passed, the other end of which passes through an eye-bolt 80 carried by the lever 40. A fixed collar 81 carried by the rod 79 abuts the eye 78 at its inner side and a spring 82 engages the eye at its other side, the spring being confined between the eye and a collar 83 fixed to the adjacent outer end of the rod. The opposite end of the rod has a collar 84 fixed to its extreme end outwardly of the eye-bolt 80, the opposite side of which is engaged by a heavy expansive spring 85 confined between it and another fixed collar 86.

This construction is such that when the operating handle 43 is in its neutral or central position and the lever 40 is substantially vertical the pawl 74 will be in its neutral or inoperative position, and when the operating handle is moved downwardly, as it preferably is during raising of the body the rod 79 is pulled to the left engaging the tooth 77 with the wheel 68. This provides an effective assurance against dropping of the body upon failure of a cable or the like, for as stated the shape of the tooth 77 permits counter-clockwise rotation of the wheel during upward movement of the body, but will arrest any clockwise movement. During the raising the tooth successively engages the teeth of the wheel as it turns, being permitted movement by the yielding of the spring 82.

If it is desired to tilt the body before it reaches its fully raised position, the operator reverses the position of the operating handle 43 and engages it with the upper notch 45 of the stop, as illustrated in Figure 3. This disengages the latch 31 in the manner hereinbefore described, and moves the pawl 74 to engage the outermost end 87 of its lower arm 75 with the teeth of the wheel 68, the spring 85 taking up any slack which exists and yeilding in the event of misalignment between the pawl end 87 and the teeth of the wheel. The engagement of the end 87 with the wheel teeth arrests both clockwise and counter-clockwise rotation of the wheel 65 and as the latch 31 has been disengaged, continued raising force applied by the winding up of the cables merely tilts the body about the shaft 26.

If the body is to be raised to its uppermost limit the handle 43 is merely moved to its lowered position as before described and when the body approaches its uppermost limit, the stop 36 disengages the latch 31 and a stop 88, by engaging the upper edge of the carriage member 16, limits further upward movement, whereupon continued operation of the elevating means merely tilts the body.

To relieve the rear right spring of the vehicle, when the body is tilted and the major portion of the load is at the right of the vehicle, a leg structure is provided. This structure consists of two bars 89 and 90 connected for longitudinal movement with respect to each other, the bar 89 having ratchet teeth 91 with which a pawl 92 carried by the bar 90 engages. The upper end of the bar 89 is fixed to a bifurcated connecting member 93 which is pivotally connected with a member 94 journalled on a shaft 95 between suitable collars 96 to provide a substantially universally movable mounting for the leg structure.

The shaft 95 is fixed as at 97 to the two innermost cross channels 23 of the body bottom at a point slightly outwardly of the shaft 26 and the lower end of the bar 90 has a foot 98 pivoted thereto to engage the surface of the road. To prevent sliding of the foot when the leg structure is moved to its operative position illustrated in Figure 1, its corners are bent downwardly.

In this manner the load on the right rear vehicle spring is considerably lessened, and when not in use the leg structure is collapsed and supported beneath the body as illustrated in Figure 2.

A sliding door 99 provided in the right side of the body facilitates emptying its contents, as the material may be discharged therethrough when the body is elevated and tilted; and to facilitate the filling of containers such as baskets for carrying coal, etc. a suitable step 100 of any desired construction is supported from the body when in its raised position.

From the foregoing description taken in connection with the accompanying drawings it will be readily apparent to those skilled in the art to which a device of this character appertains, that I provide a novel vehicle body construction wherein a single means is utilized to elevate the body and also tilt the body, and wherein the body is tilted to the side to facilitate unloading.

What I claim as my invention is:

1. The combination with a vehicle body, of a vertical guideway at each end of the body, a member movable along each vertical guideway, means for tiltably connecting the body with said member, and single means connected with said member and with said body for moving said member vertically along the guideway and for tilting the body.

2. The combination with a vehicle body, of a vertical guide, a carriage movable along said guide, means connecting the body with the carriage and permitting tilting of the body with respect to the carriage, and single means connected with said carriage and with said body for moving the carriage along the vertical guide and tilting the body.

3. The combination with a vehicle body, of a substantially vertical guideway at each end of the body, a carriage movable along each guideway, means supporting the body from the carriages for vertical movement therewith, a single means for alternatively raising said body and carriages and tipping said body, and means rendering said tipping means operative at one of a plurality of selected elevations.

4. The combination with a vehicle body, of a substantially vertical guideway at each end of the body, a member movable along each guideway, means connecting the body with each member for movement therewith, a single means for simultaneously elevating said members and for tilting said body, and means holding said members stationary while said single means tilts said body.

5. The combination with a vehicle body, of a substantially vertical guideway at each end of the body, a carriage movable along each guideway, means connecting the body with the carriages and permitting tilting of the body to one side, a single means for raising the carriages and tilting said body, and means to selectively render the carriage stationary during the tilting of the body.

6. The combination with a vehicle body, of means mounting the body for vertical and tilting movements, a single means connected to said means and to said body for elevating and tilting the body, a releasable latch for normally preventing tilting of the body, and single means for releasing the latch and arresting elevation of the body whereby further operation of said first-mentioned single means tilts the body.

7. The combination with a vehicle body, of means mounting the body for vertical movement and tilting movement about an axis, means for elevating the body substantially vertically, said means for elevating the body at all times tending to tilt the body, a releasable latch normally preventing tilting of the body, and means for disengaging said releasable latch when the body reaches its uppermost limit of movement whereby continued operation of said elevating means automatically tilts the body, while maintaining said axis stationary.

8. The combination with a vehicle body, of means mounting the body for vertical and tilting movements, means for elevating the body, said elevating means at all times tending to tilt the body, latch means normally maintaining said body against tilting during elevation thereof, means for arresting the elevation of the body, and means for releasing said latch means upon the arresting of the elevation of the body, whereby said body may be tilted about a stationary axis.

9. The combination with a vehicle body, of means mounting the body for vertical and tilting movements, means for elevating the body, said elevating means being adapted to tilt the body, means normally preventing tilting of the body, means disabling said last-mentioned means at a predetermined point to permit tilting of the body, the disabling of said last named means arresting vertical movement of the body in either direction.

10. The combination with a vehicle body, of means mounting the body for vertical movement, a toothed wheel movable with the body, a stationary rack with which the toothed wheel meshes whereby movement of the body imparts rotation to the wheel, and a composite pawl having two operative positions of engagement with the wheel whereby when in one position upward movement of the body is permitted and downward movement thereof prevented and when in the other position both upward and downward movements are prevented.

11. The combination with a vehicle body, of a substantially vertical guideway at each end of the body, a member movable along each guideway, means connecting the body with each member for movement therewith, means for simultaneously elevating said members to elevate the body, means for arresting elevation of the body, and means connecting the elevating means with the body whereby continued operation of said elevating means after the upward movement of the body is arrested, causes rotation of the body about a fixed axis intermediate the ends thereof.

12. The combination with a vehicle body of substantially vertical guideways adjacent the ends of the body, members movable along the guideways, means tiltably connecting the body with said members adjacent one side of the body, means for elevating said members to elevate the body, and means connecting the elevating means with the body adjacent its side opposite its connection with the said members whereby the elevating means also tilts the body and means rendering said members stationary during said tilting.

13. In combination with a vehicle body having a vertical guideway, a carriage movable along said guideway, means connecting the body with the carriage and permitting tilting of the body with respect to the carriage and a single means movably connected with said carriage and fixedly connected with said body for alternatively moving the carriage along the vertical guideway and tilting the body.

14. In combination with a vehicle body, a substantially vertical guideway at each end of said body, a carriage mounted for vertical movement on each of said guideways, said body member being tiltably mounted on said carriages, a sheave mounted on each carriage and a pair of sheaves mounted adjacent the upper end of each guideway, a pair of flexible members each attached at one end to the body and trained around said sheaves at its end of the body so that a tension exerted on the free end of said flexible members tends to both raise said carriages and tilt said body.

15. In combination with a vehicle body, a substantially vertical guideway at each end of said body, a carriage mounted for vertical movement on each of said guideways, said body member being tiltably mounted on said carriages, a sheave mounted on each carriage and a pair of sheaves mounted adjacent the upper end of each guideway, a pair of flexible members each attached at one end to one end of said body and trained around the sheaves at its end of the body so that a tension exerted on the free end of said flexible members tends to both raise said carriages and tilt said body, and means to releasably hold said body against tilting.

16. In combination with a vehicle body, a substantially vertical guideway at each end of said body, a carriage mounted for vertical movement on each of said guideways, said body member being tiltably mounted on said carriages, a sheave mounted on each carriage and a pair of sheaves mounted adjacent the upper end of each guideway, a pair of flexible members each attached at one end to one end of the body and trained around the sheaves at its end of the body so that a tension exerted on the free end of said flexible members tends to both raise said carriages and tilt said body, means to releasably hold said body against tilting and means operable upon the release of said last named means to render said carriage stationary.

In testimony whereof I have hereunto affixed my signature.

THEODORE C. HOLLNAGEL.